United States Patent
Bae et al.

(10) Patent No.: US 9,804,323 B2
(45) Date of Patent: Oct. 31, 2017

(54) LIGHT CONVERSION DEVICE AND MANUFACTURING METHOD THEREOF, AND LIGHT SOURCE UNIT INCLUDING THE LIGHT CONVERSION DEVICE

(71) Applicant: SAMSUNG ELECTRONICS CO., LTD., Suwon-si, Gyeonggi-do (KR)

(72) Inventors: Min Jong Bae, Yongin-si (KR); Jeong Hee Lee, Seongnam-si (KR); Dong Earn Kim, Seoul (KR); Sang Eui Lee, Hwaseong-si (KR); Na Youn Won, Seoul (KR); Hyun A Kang, Suwon-si (KR); Shin Ae Jun, Seongnam-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 262 days.

(21) Appl. No.: 14/251,881

(22) Filed: Apr. 14, 2014

(65) Prior Publication Data
US 2015/0062967 A1   Mar. 5, 2015

(30) Foreign Application Priority Data

Aug. 30, 2013   (KR) .................. 10-2013-0103979

(51) Int. Cl.
*G02B 6/00* (2006.01)
*F21V 8/00* (2006.01)

(52) U.S. Cl.
CPC ....... *G02B 6/0096* (2013.01); *Y10T 29/49826* (2015.01)

(58) Field of Classification Search
CPC .. G02B 6/0023; G02B 6/0026; G02B 6/0028; F21V 9/16; F21V 9/56; C09K 11/02–11/025; H01L 33/50–33/508
See application file for complete search history.

(56) References Cited

U.S. PATENT DOCUMENTS

| | | | |
|---|---|---|---|
| 6,283,602 B1 * | 9/2001 | Kawaguchi | G02B 6/001 362/23.09 |
| 6,501,091 B1 * | 12/2002 | Bawendi | B82Y 10/00 257/100 |
| 7,819,539 B2 * | 10/2010 | Kim | H01L 33/507 313/110 |
| 8,294,168 B2 | 10/2012 | Park et al. | |
| 9,167,659 B2 * | 10/2015 | Coe-Sullivan | H05B 33/145 |
| 2003/0128538 A1 * | 7/2003 | Shinohara | G02B 6/0016 362/610 |
| 2006/0103589 A1 * | 5/2006 | Chua | G02B 6/0023 345/3.1 |

(Continued)

FOREIGN PATENT DOCUMENTS

| KR | 1020120061538 A | 6/2012 |
|---|---|---|
| KR | 1020120105953 A | 9/2012 |

*Primary Examiner* — Julie Bannan
(74) *Attorney, Agent, or Firm* — Cantor Colburn LLP

(57) ABSTRACT

A light source unit includes a light guide plate which includes a front surface and a rear surface which are opposite to each other and a side between and connecting the front surface and the rear surface, a light conversion device on the side of the light guide plate; and a light source which generates and supplies light to the light conversion device. The light conversion device includes, a sealed tube, a light conversion member within the sealed tube and a space other than an area in the tube which is occupied by the light conversion member, defined in the tube.

21 Claims, 9 Drawing Sheets

(56) References Cited

U.S. PATENT DOCUMENTS

| | | | |
|---|---|---|---|
| 2006/0244358 A1* | 11/2006 | Kim | C09K 11/025 313/486 |
| 2007/0262714 A1* | 11/2007 | Bylsma | G01J 1/58 313/512 |
| 2008/0173886 A1* | 7/2008 | Cheon | C09K 11/02 257/98 |
| 2010/0051898 A1* | 3/2010 | Kim | C09K 11/02 257/9 |
| 2010/0157406 A1* | 6/2010 | Gruhlke | G02B 26/001 359/238 |
| 2010/0283036 A1* | 11/2010 | Coe-Sullivan | H05B 33/145 257/13 |
| 2010/0283072 A1* | 11/2010 | Kazlas | G02B 6/005 257/98 |
| 2011/0141769 A1* | 6/2011 | Lee | G02B 6/0023 362/629 |
| 2011/0304524 A1* | 12/2011 | Seen | H04M 1/22 345/55 |
| 2011/0309325 A1* | 12/2011 | Park | H01L 25/0753 257/13 |
| 2012/0075837 A1 | 3/2012 | Um | |
| 2012/0113671 A1 | 5/2012 | Sadasivan et al. | |
| 2012/0113672 A1* | 5/2012 | Dubrow | B82Y 20/00 362/602 |
| 2012/0236587 A1 | 9/2012 | Kim et al. | |
| 2013/0114299 A1 | 5/2013 | Lee et al. | |
| 2013/0271961 A1* | 10/2013 | Nakamura | F21V 9/00 362/97.2 |
| 2014/0009959 A1* | 1/2014 | Park | F21V 9/16 362/559 |

\* cited by examiner

122

121

LIGHT CONVERSION DEVICE AND MANUFACTURING METHOD THEREOF, AND LIGHT SOURCE UNIT INCLUDING THE LIGHT CONVERSION DEVICE

CROSS-REFERENCE TO RELATED APPLICATIONS

This application claims priority to Korean Patent Application No. 10-2013-0103979 filed on Aug. 30, 2013, and all the benefits accruing therefrom under 35 U.S.C. §119, the entire contents of which are incorporated herein by reference.

BACKGROUND (a) Field

This present invention relates to a light conversion device, a manufacturing method thereof, and a light source unit which emits white light using the light conversion device.

(b) Description of the Related Art

A method of emitting light in a display device includes using a quantum dot package as a light conversion unit that converts blue light such as from a blue light emitting diode ("LED") to implement white light.

SUMMARY

One or more embodiment of the present invention provides a relatively simple method of manufacturing a light conversion device.

Further, one or more embodiment of the present invention provides a light conversion device in which bubbles and/or cracks are reduced or effectively prevented.

An embodiment provides a light conversion device including a sealed tube, a light conversion member within the sealed tube, and a space other than an area in the tube which is occupied by the light conversion member, defined in the tube.

The light conversion member may be a film which includes a quantum dot material and a resin and has a band shape, and the light conversion member may further include a scattering agent.

The tube may include glass or a polymer, and may be transparent or translucent.

The quantum dot material may include a Si-containing nanocrystal, a group II-VI compound semiconductor nanocrystal, a group III-V compound semiconductor nanocrystal, a group IV-VI compound semiconductor nanocrystal or a combination thereof, and may include CdS, CdSe, CdTe, ZnS, ZnSe, ZnTe, HgS, HgSe, HgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, CdZnSeS, CdZnSeTe, CdZnSTe, CdHgSeS, CdHgSeTe, CdHgSTe, HgZnSeS, HgZnSeTe, HgZnSTe, GaN, GaP, GaAs, AlN, AlP, AlAs, InN, InP, InAs, GaNP, GaNAs, GaPAs, AlNP, AlNAs, AlPAs, InNP, InNAs, InPAs, GaAlNP, GaAlNAs, GaAlPAs, GaInNP, GaInNAs, GaInPAs, InAlNP, InAlNAs, InAlPAs, SbTe or a combination thereof.

The resin may include silicon, epoxy, acrylate or a combination thereof.

The light conversion member may include a film which converts first light into white light. The light conversion member may include a first film which converts first light into second light and a second film which converts the first light into third light, where the first light may be blue light, the second light may be green light and the third light may be red light. The light conversion member may further include a third film which converts ultraviolet light into blue light. Alternatively, the light conversion member may further include a third film which converts the first light into fourth light, where the first light may be ultraviolet light, the second light may be green light, the third light may be red light and the fourth light may be blue light.

The light conversion device may further include inert gas which fills the space other than the area in the tube which is occupied by the light conversion member, and the inert gas may include nitrogen.

The light conversion device may further include a resin which fills the space other than the area in the tube which is occupied by the light conversion member.

Another embodiment provides a light source unit including a light guide plate which includes a front surface and a rear surface which are opposite to each other and a side between and connecting the front surface and the rear surface, a light conversion device on the side of the light guide plate, and a light source which generates and supplies light to the light conversion device. The light conversion device may include a sealed tube, a light conversion member within the sealed tube, and a space other than an area in the tube which is occupied by the light conversion member, defined in the tube.

The light source unit may further include a light guide rod which is on a side of the light conversion device and has a wedge shape, and the light source may be disposed on a surface corresponding to a head (e.g., largest cross-sectional thickness portion) of the wedge shape of the light guide rod.

Both the light source and the light conversion device may have a rod shape.

The light conversion member may be a film which includes a quantum dot material and a resin and may have a band shape, the tube may be transparent or translucent and may include glass or a polymer, and the light conversion device may further include an inert gas or a resin which fills the space other than the area in the tube which is occupied by the light conversion member.

Yet another embodiment provides a method of manufacturing a light conversion device, including preparing a tube with an open end, preparing a solid state light conversion member having a predetermined shape, inserting the light conversion member into the tube, and sealing the open end of the tube.

The method may further include, before or after the inserting the light conversion member into the tube, filling an inner area of the tube with a filling material.

According to one or more embodiment, a light conversion material is manufactured to be a band shaped film or a rod shaped member which is within a tube, such that a light conversion device may be simply manufactured and free from problems such as bubbles and cracks.

BRIEF DESCRIPTION OF THE DRAWINGS

The above and other features of this invention will become more apparent by describing in further detail embodiments thereof with reference to the accompanying drawings in which.

DETAILED DESCRIPTION

Figure 1:
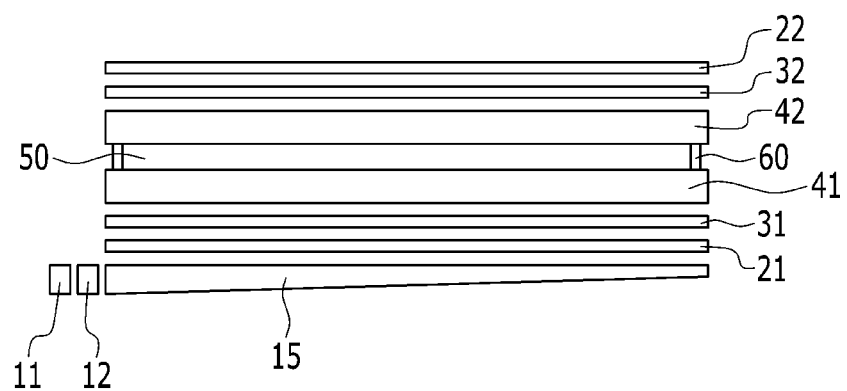
FIG. 1 is a cross-sectional view of a liquid crystal display to which a light source unit according to an embodiment, is applied.

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

It will be understood that when an element or layer is referred to as being "on," "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. As used herein, connected may refer to elements being physically and/or electrically connected to each other. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially relative terms, such as "below," "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

As a structure of a quantum dot package of a display device, the quantum dot package may be a film type or a rod type. In the display device, the film type quantum dot package is attached so as to cover an entire light emitting surface of a light guide plate. However, for the film type quantum dot package, as the size of the display device is increased, an area of the film correspondingly needs to be increased. Where the size of the film increases, the cost of the display device also increase since the quantum dot material is relatively expensive. Further, manufacturing a film with a uniform light conversion characteristic by distributing the quantum dot material in a wide area may be difficult.

In order to solve the above problem, a rod-type quantum dot package is suggested. The rod-type quantum dot package is manufactured such that a quantum dot material is injected into a relatively narrow glass tube so as to fill the glass tube. However, during the process of hardening the quantum dot material which has been injected into the tube, bubbles occur within the injected quantum dot material and/or the tube is cracked due to a difference in coefficients of thermal expansion of the quantum dot material and a material of the tube. Further, since a periphery of the tube is contaminated after injecting the quantum dot material into the tube, the periphery is further cleaned in order to provide a proper surface such that an end portion of the tube can be properly and reliably sealed after injecting the quantum dot material into the tube.

Hereinafter, the invention will be described in detail with reference to the accompanying drawings.

Referring to FIG. 1, a liquid crystal display to which a light source unit according to an embodiment is applied will be described.

FIG. 1 is a cross-sectional view of a liquid crystal display to which a light source unit according to an embodiment is applied.

The liquid crystal display to which a light source unit according to an embodiment is applied includes a liquid crystal panel which includes a lower substrate 41, an upper substrate 42 and a liquid crystal layer 50 interposed between the substrates and sealed therebetween by a sealing material 60, optical films 31 and 32 and polarizing films 21 and 22 which are disposed respectively above and below the liquid crystal panel, and a light source unit which includes a light guide plate 15, a light conversion device 12, and a light source 11.

The two substrates 41 and 42 of the liquid crystal panel include a transparent insulating material such as glass, and may be flexible and include plastic. The liquid crystal layer 50 may be one of various liquid crystals such as a twisted-nematic ("TN") liquid crystal or a vertically aligned ("VA") liquid crystal.

The optical films 31 and 32 are exemplified to be disposed on an upper side and a lower side of the liquid crystal panel, respectively, but one optical film may be disposed only on either of the upper side and the lower side of the liquid crystal panel or a plurality of optical films may be collectively disposed on the upper side or the lower side. The optical films 31 and 32 may include a phase retardation film which retards a phase of the light to change a polarization status and/or a diffusion film which uniformly distributes the light.

The light source 11 of the light source unit may be a dot-type (e.g., discrete or point) light source, and may include one blue light emitting diode ("LED") or ultraviolet ray light LED, or a rod-type light source in which blue LEDs or ultraviolet ray light LEDs are arranged.

The light conversion device 12 includes a quantum dot or quantum dot material in which a semiconductor or a metal particle is disposed having a size of a nanometer unit. The quantum dot converts blue light or ultraviolet ray light into green light, red light and/or blue light depending on a size of the quantum dot, to convert the blue light or the ultraviolet ray light emitted from the light source 11 into white light.

The quantum dot may include a central nanocrystal, and a shell nanocrystal which encloses the central nanocrystal. The quantum dot may further include an organic ligand which is coupled to the shell nanocrystal. The quantum dot may further include an organic coating layer which encloses the shell nanocrystal. With this structure, a size of the central nanocrystal is defined to adjust a conversion wavelength.

The light guide plate 15 disperses linear light provided from the light conversion device 12 and converts the linear light into surface light. A cross-sectional thickness of the light guide plate 15 may decrease as a distance from the light conversion device 12 increases. A portion of the light guide plate 15 having the largest cross-sectional thickness may be considered a "head" of the light guide plate 15.

In such a light source unit, the light conversion device 12 converts the blue light or the ultraviolet ray light generated and emitted from the light source 11 into white light, to provide the converted white light to the light guide plate 15.

The light guide plate 15 disperses the converted white linear light or point light into white surface light, thereby emitting the white surface light toward the liquid crystal panel. The blue light or the ultraviolet ray light is converted into white light by using the light conversion device 12 which includes the quantum dot material so that white light having a clear peak of not only the blue light, but also the green light and the red light, is generated. Therefore, purity of a color which is selected by a color filter of the liquid crystal panel is relatively high and a color range which may be reproduced by the liquid crystal display is wide. Further, the blue light or the ultraviolet ray light emitted by the light source 11 is directly converted into white point light or linear light by the light conversion device 12 and then converted into the surface light using the light guide plate 15 so that uniformity of the white surface light is high.

Now, the light source unit will be described in detail.

Figure 2:
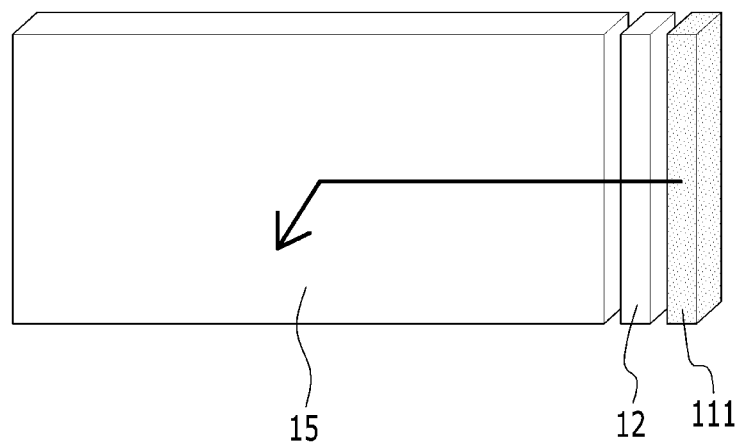
FIGS. 2 and 3 are perspective views of light source units according to various embodiments.
Figure 3:
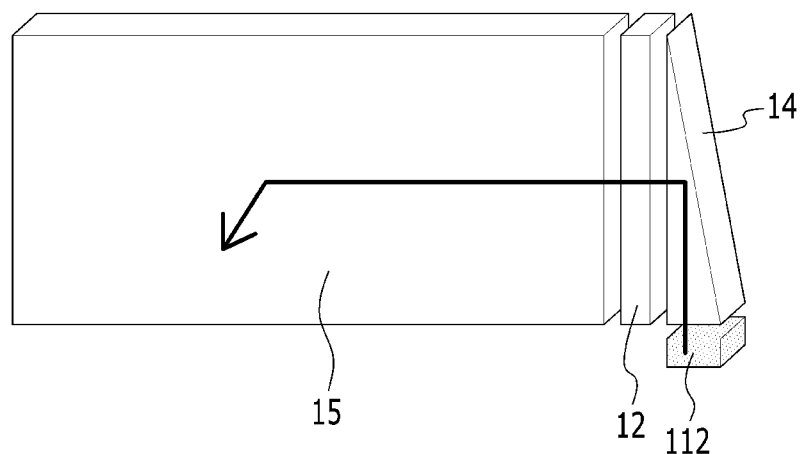

FIGS. 2 and 3 are perspective views of light source units according to various embodiments.

Referring to FIG. 2, in the light source unit according to an embodiment, a rod-type light conversion device 12 and a rod-type light source 111 are disposed on one side of the light guide plate 15 having rectangular front and rear surfaces, and four side surfaces between and connecting the front and the rear surfaces. In a plan view, the rectangular-shaped light guide plate 15 has parallel long sides opposing each other, and parallel short sides opposing each other. The light conversion device 12 and the rod-type light source 111 are illustrated to be disposed on a short side of the light guide plate 15, but may be disposed on a long side thereof.

Referring to FIG. 3, in a light source unit according to an embodiment, a rod shaped light conversion device 12 and a wedge shaped light guide rod 14 are disposed on a short side of a light guide plate 15. A point light source 112 is disposed on an incident surface corresponding to a head of the wedge-shape of the light guide rod 14. The light conversion device 12, the wedge shaped light guide rod 14 and the point light source 112 are illustrated to be disposed on the short side of the light guide plate 15, but may be disposed on a long side thereof.

Such light source units have excellent uniformity of light, and reduce an amount of the quantum dot material included therein, to reduce a manufacturing cost as compared with a quantum dot package which is disposed across substantially an entire of a light emitting surface of the light guide plate 15.

Now, the light conversion device will be described in detail.

Figure 4:
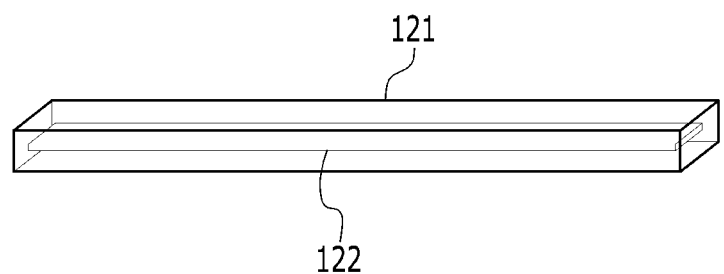
FIGS. 4 and 5 are perspective views of light conversion devices according to various embodiments.
Figure 5:
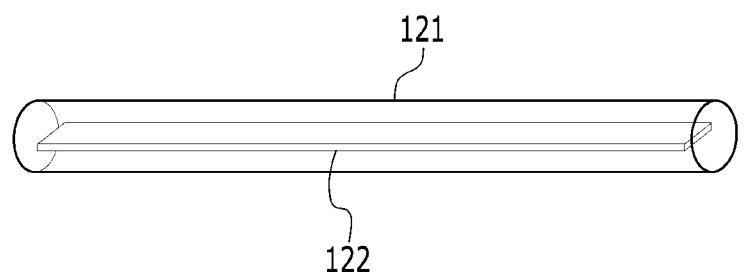

FIGS. 4 and 5 are perspective views of light conversion devices according to various embodiments.

Referring to FIG. 4, a light conversion device according to an embodiment has a structure in which a band shaped light conversion film 122 with a smaller cross-sectional thickness than width is within a rectangle-container shaped tube 121 of which both ends are sealed to seal the light conversion film 122 therein. The light conversion film 122 and the tube 121 may be elongated in a length direction, and the width may be taken perpendicular to the length direction. A cross-section of the tube 121 is rectangular, but the present invention is not limited thereto. As the band shape, the light conversion film 122 may be a solid-state elongated member, having a relatively small but uniform cross-sectional thickness as compared to a length and/or width thereof.

The tube 121 may include a material such as glass or a polymer, and protects the light conversion film 122 from moisture and heat. The tube 121 may be transparent or may be translucent for light scattering. A size of the tube 121 may be determined in accordance with a purpose of the light conversion device. Ann interior dimension of the tube may be about 0.01 millimeter (mm) to about 50 mm.

In an embodiment of manufacturing the light conversion device, the light conversion film 122 is formed by combining the quantum dot material with a resin, and may include a scattering agent such as silica or an auxiliary component which improves an optical characteristic. As a quantum dot material, nanocrystals selected from a Si-based nanocrystal, a group II-VI compound semiconductor nanocrystal, a group III-V compound semiconductor nanocrystal, a group IV-VI compound semiconductor nanocrystal, or a combination thereof may be used. The II-VI group compound semiconductor nanocrystal includes CdS, CdSe, CdTe, ZnS, ZnSe, ZnTe, HgS, HgSe, HgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, CdZnSeS, CdZnSeTe, CdZnSTe, CdHgSeS, CdHgSeTe, CdHgSTe, HgZnSeS, HgZnSeTe, and HgZnSTe. The III-V group compound semiconductor nanocrystal includes GaN, GaP, GaAs, AlN, AlP, AlAs, InN, InP, InAs, GaNP, GaNAs, GaPAs, AlNP, AlNAs, AlPAs, InNP, InNAs, InPAs, GaAlNP, GaAlNAs, GaAlPAs, GaInNP, GaInNAs, GaInPAs, InAlNP, InAlNAs, and InAlPAs. The IV-VI group compound semiconductor nanocrystal includes SbTe. The resin includes silicon, epoxies, acrylates and a combination thereof.

The light conversion film 122 may include a quantum dot which converts blue light into green light, a quantum dot which converts blue light into red light, a quantum dot which converts ultraviolet ray light into blue light, a quantum dot which converts ultraviolet ray light into green light or a quantum dot which converts ultraviolet ray light into red light, depending on whether a light source which is used together with the light conversion film emits blue light or ultraviolet ray light. Alternatively, the light conversion film 122 may include a quantum dot which converts ultraviolet ray light into blue light, a quantum dot which converts blue light into green light, and a quantum dot which converts blue light into red light.

The light conversion film 122 occupies a portion of internal space of the tube 121. A space (e.g., a remaining space) other than an area in the tube 121 which is occupied by the light conversion film 122 may be filled with an inert gas such as nitrogen, a resin which has a refractive index similar to the tube 121 and/or a resin with excellent thermal conductivity such as a filling material. When the resin which has the refractive index similar to the tube 121 is used, the extracting ratio of light emitted by the light conversion film 122 is improved. When the resin with the excellent thermal conductivity is used, heat from the light source or heat generated during the light conversion process of the light conversion film 122 is efficiently emitted to protect the light conversion film 122.

A light conversion device according to an embodiment of FIG. 5 is similar to the light conversion device according to the embodiment of FIG. 4, except that the tube 121 has a cylindrical shape, that is, an elongated circular cross-section. The cross-section and/or the overall shape of the tube 121 may have various shapes such as elliptical, polygonal or rectangular with rounded corners in addition to the cylindrical or rectangular shapes disclosed in FIG. 4 and FIG. 5. The light conversion film 122 may have various shapes such as a rod shape or an elliptical shape in addition to the band shape disclosed in FIG. 4 and FIG. 5. As the rod or elliptical shape, the light conversion film 122 may be a solid-state member, having a circular or elliptical cross-section, respectively.

A method of manufacturing the light conversion device will now be described.

FIGS. 6 to 9 are schematic views illustrating a method of manufacturing a light conversion device according to an embodiment.

Figure 6:
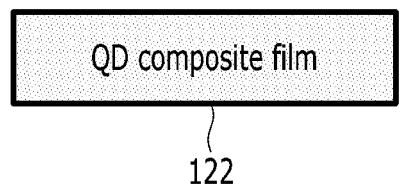
FIGS. 6 to 9 are schematic views illustrating a method of manufacturing a light conversion device according to an embodiment.
Figure 7:
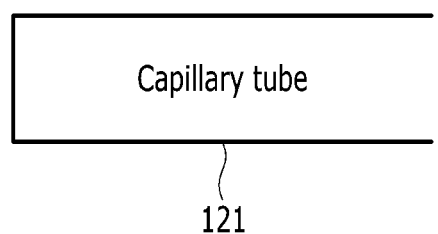

First, as illustrated in FIGS. 6 and 7, a light conversion film 122 and a tube 121 are prepared. The light conversion film 122 may be manufactured such that a quantum dot ("QD") material is uniformly dispersed within a resin which serves as a dispersive medium, such that the light conversion film 122 is formed as a relatively thin film shape using a film forming method. Film forming methods include a method which uses a roller, a film applicator method which uses a doctor blade or a method which uses a press, and then dried. The tube 121 is also manufactured using a tube manufacturing method such as an extruding or drawing-out method. In one embodiment of manufacturing the tube, a first end of the formed tube 121 may be closed while an opposing second end may be open, as illustrated in FIG. 7.

Figure 8:
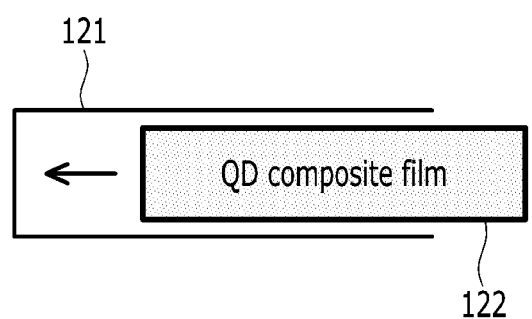
Figure 9:
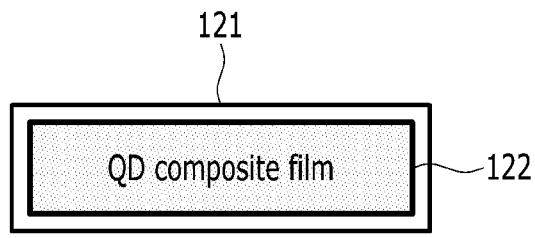

As illustrated in FIG. 8, the light conversion film 122 is inserted into the tube 121, such as through the open end thereof. The light conversion film 122 may be inserted into the tube 121 in a nitrogen atmosphere. Where the light conversion film 122 is inserted into the tube 121 in a nitrogen atmosphere, a vacuum of about $10^{-1} \sim 10^{-6}$ torr is firstly created, and then nitrogen is injected to create the nitrogen atmosphere. When the resin is filled in the tube 121, the resin may be injected first and then the light conversion film 122 may be inserted into the tube 121 having the resin therein, or the light conversion film 122 may be inserted into the tube first and then the resin may be injected in the remaining space other than an area in the tube 121 which is occupied by the previously inserted light conversion film 122.

After the light conversion film 122 is inserted into the tube 121, both ends of the tube 121 are closed to seal the tube 121. When one end of the tube 121 is already closed, only the opposing end is closed to seal the tube 121. The sealing may be performed by applying heat to the tube such as using laser irradiation, but the invention is not limited thereto.

In the above embodiment, the light conversion device includes only one light conversion film, but in alternative embodiments, the light conversion device may include a plurality of light conversion films.

In manufacturing a conventional rod-type quantum dot package, a quantum dot material is injected into a relatively narrow glass tube so as to fill the glass tube and the injected quantum dot material is thereafter hardened. However, during the process of hardening the quantum dot material which has been injected into the tube, bubbles occur within the injected quantum dot material and/or the tube is cracked due to a difference in coefficients of thermal expansion of the quantum dot material and a material of the tube. Further, a periphery of the tube is contaminated after injecting the quantum dot material into the tube, and the periphery is further cleaned in order to provide a proper surface such that an end portion of the tube can be properly and reliably sealed after injecting the quantum dot material into the tube. Such cleaning adds an additional process and cost in manufacturing the conventional rod-type quantum dot package.

In contrast, since the light conversion film member is completely prepared before being inserted into the tube, hardening or further processing of the light conversion film is obviated to reduce or effectively prevent defects such as bubbles within the injected quantum dot material or damage such as cracks in the tube due to a difference in coefficients of thermal expansion of the quantum dot material and a material of the tube.

Figure 10:
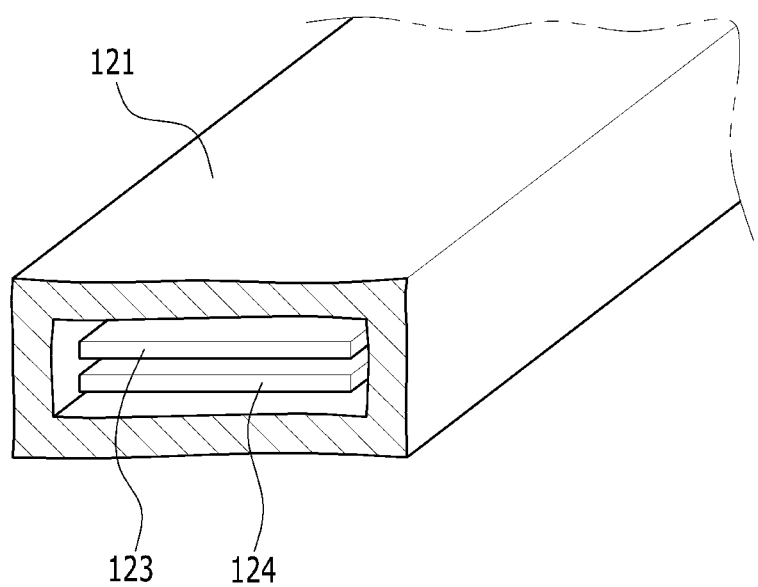
FIGS. 10 to 12 are perspective views illustrating light conversion devices according to various other embodiments.
Figure 11:
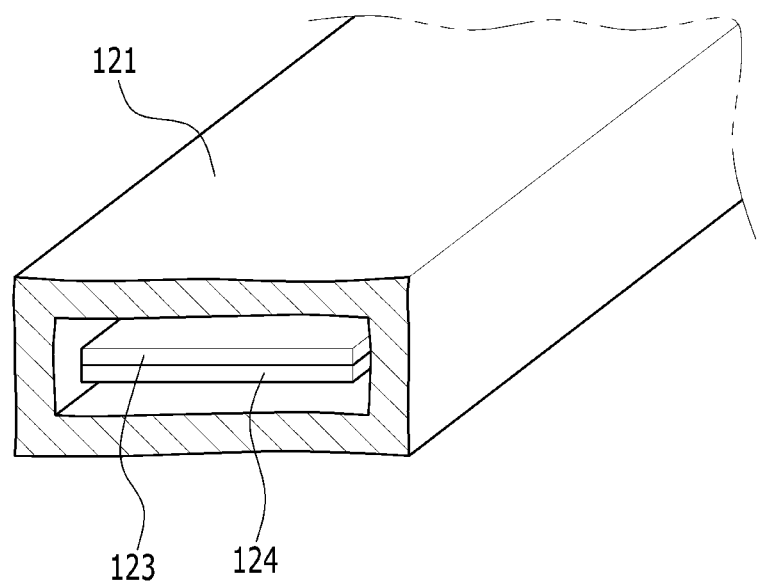
Figure 12:
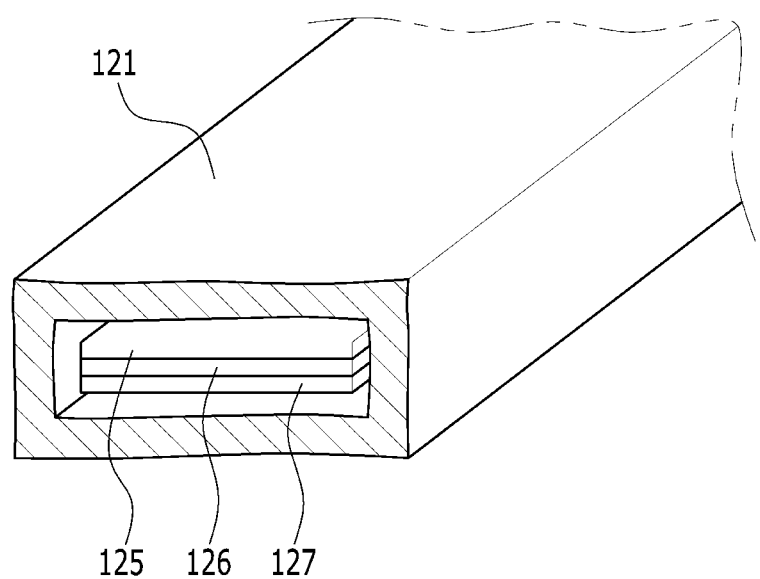

FIGS. 10 to 12 are perspective views illustrating light conversion devices according to various embodiments.

In a light conversion device according to an embodiment of FIG. 10, a first film 123 which converts blue light into green light and a second film 124 which converts blue light into red light are disposed in a tube 121. By doing this, more uniform surface light may be obtained as compared with a structure where a quantum dot which converts blue light into green light and a quantum dot which converts the blue light into red light are included in one single film. The first and second films 123 and 124 are spaced apart from each other in the cross-sectional thickness direction of the films and the tube 121. Other configurations are the same as the above-described embodiments, and thus description thereof will be omitted.

In a light conversion device according to an embodiment of FIG. 11, a first film 123 which converts blue light into green light and a second film 124 which converts blue light into red light are disposed into a tube 121 to be integrally attached thereto. In an embodiment of manufacturing a light conversion device, the first film 123 which converts blue light into green light and the second film 124 which converts blue light into red light may be attached by a lamination method. When the two films 123 and 124 are integrated, the films are easily inserted into the tube 121 as a collective unit as compared to the films 123 and 124 being separated from each other as individual units.

In a light conversion device according to an embodiment of FIG. 12, three light conversion films 125, 126 and 127 are disposed in a tube 121. The three light conversion films 125, 126 and 127 may be a first film 125 which converts ultraviolet ray light into blue light, a second film 126 which converts ultraviolet ray light into green light, and a third film 127 which converts ultraviolet ray light into red light. Further, the first film 125 which converts ultraviolet ray light into blue light, the second film 126 which converts blue light into green light, and the third film 127 which converts blue light into red light may be inserted into one single tube 121. The three light conversion films 125, 126 and 127 may be attached to each other so as to form one collective body (refer to FIG. 11), or may be separated from each other (refer to FIG. 10).

In the embodiments of FIGS. 10 to 12, a plurality of light conversion films is disposed in one single tube emit different color light, but the plurality of light conversion films which is inserted into one single tube may emit the same color light. In one embodiment, for example, each of the plurality of light conversion films may include a quantum dot material which converts blue light into green light and a quantum dot material which converts blue light into red light. When blue light is applied, each light conversion film may emit white light. Further, in another embodiment, each of the plurality of light conversion films may include a quantum dot material which converts ultraviolet ray light into blue light, a quantum dot material which converts ultraviolet ray light into green light and a quantum dot material which converts ultraviolet ray light into red light. When ultraviolet ray light is applied, each light conversion film may emit white light.

It is to be understood that this invention is not limited to the disclosed embodiments, but, on the contrary, is intended to cover various modifications and equivalent arrangements included within the spirit and scope of the appended claims.

What is claimed is:

1. A light conversion device, comprising:
a tube which is sealed;
a light conversion member within the sealed tube, the light conversion member having a band shape defining two opposing sides of the light conversion member in a longitudinal direction of the sealed tube; and
a space other than the area which is occupied by the light conversion member in the sealed tube,
wherein
the tube comprises an inner wall,
the space comprises two portions, each of which is defined respectively between the inner wall of the sealed tube and each of the two opposing sides of the light conversion member, and
the space other than the area which is occupied by the light conversion member in the sealed tube is filled with inert gas.

2. The light conversion device of claim 1, wherein
the light conversion member is a film which comprises a quantum dot material and a resin.

3. The light conversion device of claim 2, wherein
the light conversion member further comprises a scattering agent.

4. The light conversion device of claim 2, wherein
the tube comprises glass or a polymer.

5. The light conversion device of claim 4, wherein
the tube is transparent or translucent.

6. The light conversion device of claim 2, wherein
the quantum dot material comprises a Si-containing nanocrystal, a group II-VI compound semiconductor nanocrystal, a group III-V compound semiconductor nanocrystal, a group IV-VI compound semiconductor nanocrystal or a combination thereof.

7. The light conversion device of claim 6, wherein
the quantum dot material comprises CdS, CdSe, CdTe, ZnS, ZnSe, ZnTe, HgS, HgSe, HgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, CdZnSeS, CdZnSeTe, CdZnSTe, CdHgSeS, CdHgSeTe, CdHgSTe, HgZnSeS, HgZnSeTe, HgZnSTe, GaN, GaP, GaAs, AlP, AlAs, InN, InP, InAs, GaNP, GaNAs, GaPAs, AlNP, AlNAs, AlPAs, InNP, InNAs, InPAs, GaAlNP, GaAlNAs, GaAlPAs, GaInNP, GaInNAs, GaInPAs, InAlNP, InAlNAs, InAlPAs, SbTe or a combination thereof.

8. The light conversion device of claim 2, wherein
the resin comprises silicon, epoxy, acrylate or a combination thereof.

9. The light conversion device of claim 1, wherein
the light conversion member is a film which converts first light from a light source, into white light.

10. The light conversion device of claim 1, wherein
the light conversion member comprises:
a first film which converts first light from a light source, into second light, and
a second film which converts the first light into third light.

11. The light conversion device of claim 10, wherein
the first light is blue light, the second light is green light and the third light is red light.

12. The light conversion device of claim 11, wherein
the light conversion member further comprises: a third film which converts ultraviolet light into blue light.

13. The light conversion device of claim 10, wherein
the light conversion member further comprises a third film which converts the first light into fourth light.

14. The light conversion device of claim 13, wherein
the first light is ultraviolet light, the second light is green light, the third light is red light and the fourth light is blue light.

15. The light conversion device of claim 1, wherein
the inert gas comprises nitrogen.

16. A light source unit, comprising:
a light guide plate comprising:
  a front surface and a rear surface which are opposite to each other, and
  a side surface between and connecting the front surface and the rear surface;
a light conversion device on the side of the light guide plate; and
a light source which generates and supplies light to the light conversion device,
wherein the light conversion device comprises:
  a tube which is sealed;
  a light conversion member within the sealed tube, the light conversion member having a band shape defining two opposing sides of the light conversion member in a longitudinal direction of the sealed tube; and
  a space other than the area which is occupied by the light conversion member in the sealed tube,
wherein
  the tube comprises an inner wall,
  the space comprises two portions, each of which is defined respectively between the inner wall of the sealed tube and each of the two opposing sides of the light conversion member, and
the space other than the area which is occupied by the light conversion member in the sealed tube is filled with inert gas.

17. The light source unit of claim 16, further comprising
a light guide rod which is on a side of the light conversion device and has a wedge shape,
wherein the light source is on a surface of the light guide rod which corresponds to a largest thickness portion of the wedge shape of the light guide rod.

18. The light source unit of claim 16, wherein
both the light source and the light conversion device have a rod shape.

19. The light source unit of claim 16, wherein
the light conversion member is a film comprising a quantum dot material and a resin, and
the tube is transparent or translucent and comprises glass or a polymer.

20. A method of manufacturing a light conversion device, comprising:
preparing a tube in which a solid state light conversion member is sealed, the tube comprising:
  an inner area in which the solid light conversion member is sealed, and
  an inner wall which directly defines the inner area to have a predetermined shape;
disposing the tube to have an open end which exposes the inner area of the tube to outside the tube;
inserting the solid state light conversion member into the tube through the open end thereof, to expose the solid state light conversion member to the inner area of the tube; and
sealing the open end of the tube to dispose the solid state light conversion member in the inner area of the tube and to dispose the solid state light conversion member spaced apart from the inner wall of the sealed tube,
wherein
a space other than the inner area which is occupied by the solid light conversion member in the sealed tube is defined, by sealing the open end of the tube,
the space other than the inner area which is occupied by the solid light conversion member in the sealed tube is filled with inert gas,
the solid state light conversion member sealed in the tube has a band shape defining two opposing sides of the light conversion member in a longitudinal direction of the sealed tube, and
the space comprises two portions, each of which is defined respectively between the inner wall of the sealed tube and each of the two opposing sides of the light conversion member.

21. The method of claim 20, further comprising,
before the inserting the solid state light conversion member into the tube, filling the inner area of the tube with a filling material,
wherein the inserting the solid state light conversion member into the tube exposes the solid state light conversion member to the filling material which is in the tube.

* * * * *